(12) United States Patent
Son

(10) Patent No.: US 10,866,670 B2
(45) Date of Patent: Dec. 15, 2020

(54) TOUCH SENSING DEVICE

(71) Applicant: SILICON WORKS CO., LTD., Daejeon (KR)

(72) Inventor: Ji Deok Son, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 16/387,926

(22) Filed: Apr. 18, 2019

(65) Prior Publication Data

US 2019/0324584 A1 Oct. 24, 2019

(30) Foreign Application Priority Data

Apr. 18, 2018 (KR) ........................ 10-2018-0044863

(51) Int. Cl.
*G06F 3/041* (2006.01)
(52) U.S. Cl.
CPC .......... *G06F 3/0412* (2013.01); *G06F 3/0418* (2013.01)
(58) Field of Classification Search
CPC .... G06F 3/0412; G06F 3/0418; G06F 3/0443; G06F 3/041
See application file for complete search history.

(56) References Cited

U.S. PATENT DOCUMENTS

| 8,754,874 | B2 | 6/2014 | Vieta |
| 9,276,648 | B2 | 3/2016 | Lorca Hernando |
| 9,864,463 | B2 | 1/2018 | Vukovic et al. |
| 2010/0097355 | A1* | 4/2010 | Jang ...................... G06F 3/0412 345/178 |
| 2014/0197845 | A1* | 7/2014 | Ko ...................... G01R 31/2829 324/537 |
| 2015/0185276 | A1* | 7/2015 | Chang .................... G06F 3/044 702/58 |
| 2015/0319412 | A1* | 11/2015 | Koshiba .............. H01L 27/1464 348/246 |

FOREIGN PATENT DOCUMENTS

| JP | 2017-098775 A | 6/2017 |
| KR | 10-2017-0012718 A | 2/2017 |

* cited by examiner

*Primary Examiner* — Alexander Eisen
*Assistant Examiner* — Kebede T Teshome
(74) *Attorney, Agent, or Firm* — Fenwick & West LLP

(57) ABSTRACT

One exemplary embodiment provides a touch sensing device including: a first processor configured to identify a defective sensed value that satisfies a defect determination condition among the first sensed values of a plurality of electrodes disposed on a panel in a state where there is no touch or proximity of an external object to the panel; a storage unit configured to store information indicating a defective electrode corresponding to the defective sensed value among the plurality of electrodes; and a second processor configured to correct a sensed value corresponding to the defective electrode among the second sensed values of the plurality of electrodes using the sensed value of at least one electrode adjacent to the defective electrode.

16 Claims, 23 Drawing Sheets

FIG.13
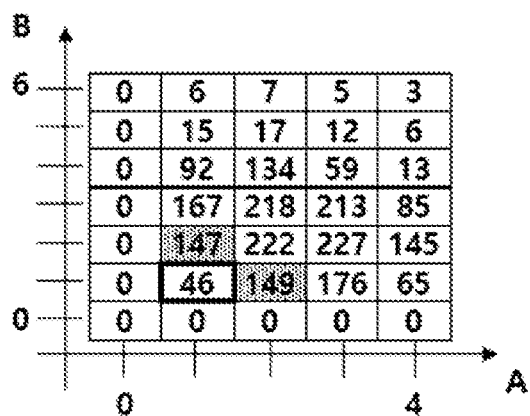
before correction
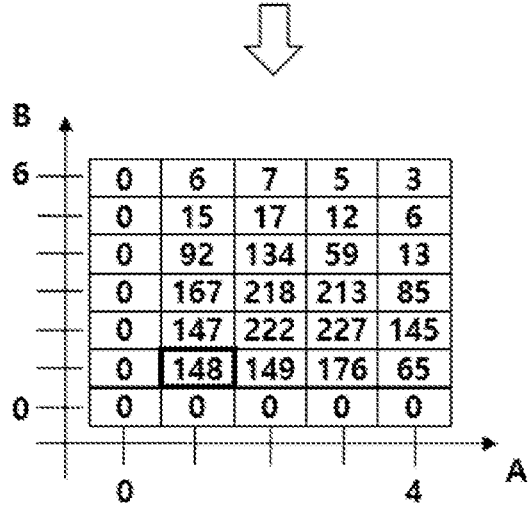
after correction before correction after correction before correction after correction

FIG.22 before correction after correction

TOUCH SENSING DEVICE

CROSS REFERENCE TO RELATED APPLICATION

This application claims priority from Republic of Korea Patent Application No. 10-2018-0044863, filed on Apr. 18, 2018, which is hereby incorporated by reference for all purposes as if fully set forth herein.

BACKGROUND

Field of the Invention

The present disclosure relates to a technique for sensing a touch and a display device.

Description of the Prior Art

The distance between electrodes disposed on a panel is becoming shorter. A shorter distance between electrodes makes it possible to configure a high-resolution panel but increases the probability of a defect while manufacturing or using a panel. For example, a short circuit may occur between electrodes disposed on a panel, or the probability of an open failure may increase.

When an electrode is a touch electrode, touch sensitivity may be reduced due to a short circuit between the electrodes, or a touch may not be detected at an electrode. Not only a short circuit but an open failure of electrodes may also cause similar problems. For example, if an open failure occurs in a line connected to a touch electrode, a touch may not be detected at the electrode.

Conventionally, when these problems, such as a short circuit or an open failure of an electrode, are detected in the process of manufacturing a panel, the panel is discarded. Further, if these problems are detected during the use of the product, the panel is replaced or the product is discarded.

However, as a panel becomes large-sized, losses due to the disposal of the panel increase. Thus, studies on techniques for using the panel rather than discarding the panel have been required.

SUMMARY

An aspect of one embodiment is to provide a technique for reusing a panel including a defective electrode while minimizing quality deterioration.

In accordance with the foregoing aspect, one embodiment provides a touch sensing device including a first processor, a storage unit, and a second processor.

The first processor may identify a defective sensed value that satisfies a defect determination condition among the first sensed values of a plurality of electrodes disposed on a panel in a state where there is no touch or proximity of an external object to the panel.

The storage unit may store information indicating a defective electrode corresponding to the defective sensed value among the plurality of electrodes.

The second processor may correct a sensed value corresponding to the defective electrode among the second sensed values of the plurality of electrodes using the sensed value of at least one electrode adjacent to the defective electrode.

The first processor may identify the defective sensed value at a start time of an operation.

The first processor may identify the defective sensed value at an in-operation time rather than the start time of the operation. The first processor may generate the first sensed values using raw sensed values received from a driving circuit at a start time of an operation, and may identify the defective sensed value when a difference between the raw sensed values and the first sensed values is a certain value or less during the in-operation time. The first processor may update the first sensed values by averaging the raw sensed values obtained from a plurality of frames when the difference between the raw sensed values and the first sensed values is the certain value or less during the in-operation time.

The second processor may correct the sensed value corresponding to the defective electrode when at least one sensed value among the second sensed values satisfies a touch determination condition.

The first processor may generate the first sensed values by averaging the sensed values of the respective electrodes obtained from a plurality of frames.

The first processor may select representative sensed values from among the first sensed values and may identify a sensed value, which is different by a certain value or greater from the average value of the representative sensed values, among the first sensed values as the defective sensed value.

When a plurality of defective electrodes is adjacent to each other in a first direction, the second processor may replace the sensed value of each defective electrode with the average value of sensed values of two adjacent electrodes in a second direction perpendicular to the first direction.

When the defective electrode is disposed at the edge of the plurality of electrodes, the second processor may replace the sensed value of the defective electrode with the average value of sensed values of two adjacent electrodes in parallel with the edges.

When the defective electrode is disposed in a corner of the plurality of electrodes, the second processor may replace the sensed value of the defective electrode with the average value of sensed values of two adjacent electrodes in first and second directions.

Another embodiment provides a touch sensing device including an external memory, a correction processor, and a coordinate calculator. In this embodiment, the correction processor and the coordinate calculator may be disposed in an integrated circuit, and the external memory may be disposed outside the integrated circuit.

When there are four upper, lower, right, and left electrodes adjacent to the defective electrode, the correction processor may replace the sensed value of the defective electrode with a value obtained by putting the sensed values of the four electrodes into a b-spline equation.

When the defective electrode is disposed at edges of the plurality of electrodes, the correction processor may replace the sensed value of the defective electrode with a value obtained by putting the sensed values of four adjacent electrodes in parallel with the edges into a bicubic equation.

The external memory may include an interface configured to record the information in an internal cell according to a signal externally input.

The second sensed values of the plurality of electrodes may be sensed values when there is a touch or proximity of the external object to the panel.

A display panel and a touch panel may be integrated to form the panel.

The touch sensing device may further include a receiver configured to receive the sensed values of the plurality of electrodes from a plurality of driving integrated circuits that drives the plurality of electrodes separately by area. The driving integrated circuits may supply a driving signal, which alternates between a first voltage and a second voltage, to the electrodes and may generate the sensed values of the electrodes according to a response signal formed on the electrodes corresponding to the driving signal, and a voltage having a voltage level different from the first voltage and the second voltage may be formed on the defective electrode.

As described above, according to exemplary embodiments, it is possible to reuse a panel including a defective electrode while minimizing quality deterioration, thereby minimizing damages due to the disposal of the panel.

BRIEF DESCRIPTION OF THE DRAWINGS

The above and other aspects, features and advantages of the present disclosure will be more apparent from the following detailed description taken in conjunction with the accompanying drawings, in which:

FIG. 13 illustrates a third example in which a touch sensing device corrects a defective touch electrode according to an exemplary embodiment;

FIG. 22 illustrates a seventh example in which a touch sensing device corrects a defective touch electrode according to another exemplary embodiment.

DETAILED DESCRIPTION

Figure 1:
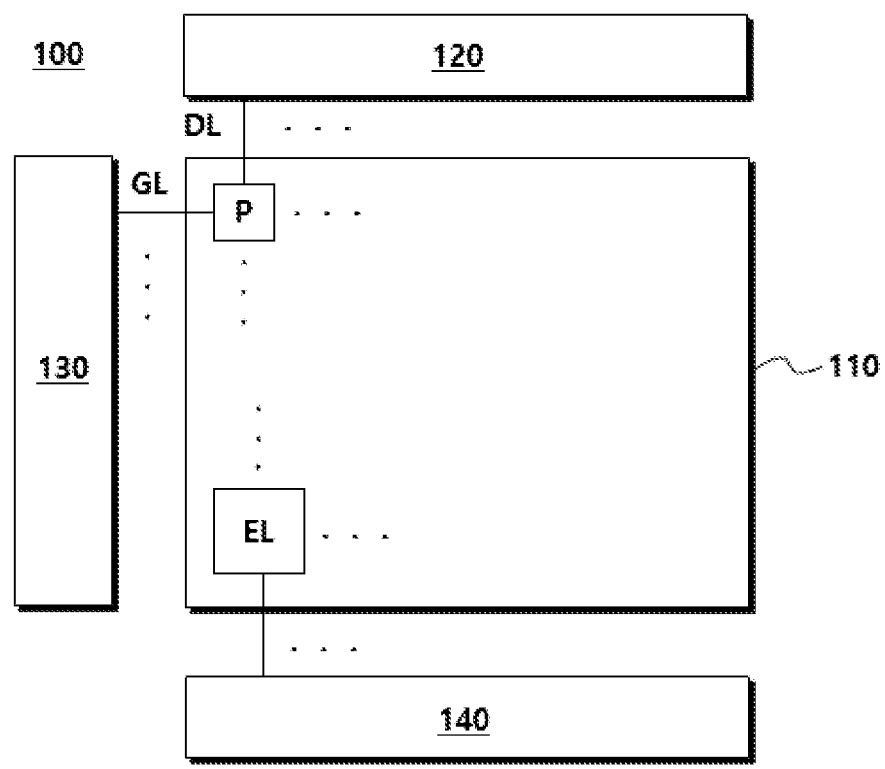
FIG. 1 illustrates the configuration of a display device according to an exemplary embodiment.

Hereinafter, embodiments of the present disclosure will be described in detail with reference to the accompanying drawings. In adding reference numerals to elements in each drawing, the same elements will be designated by the same reference numerals as far as possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence or the like of a corresponding structural element are not limited by the term. When it is described in the specification that one component is "connected," "coupled" or "joined" to another component, it should be read that the first component may be directly connected, coupled or joined to the second component, but also a third component may be "connected," "coupled," and "joined" between the first and second components.

FIG. 1 illustrates the configuration of a display device according to an exemplary embodiment.

Referring to FIG. 1, the display device 100 includes a panel 110, a data drive device 120, a gate drive device 130, and a touch sensing device 140.

Each of the data drive device 120, the gate drive device 130, and the touch sensing device 140 may drive at least one component included in the panel 110.

The data drive device 120 may drive a data line DL connected to a pixel P, and the gate drive device 130 may drive a gate line GL connected to the pixel P. The touch sensing device 140 may drive a touch electrode EL disposed on the panel 110.

The data drive device 120 may supply a data voltage to the data line DL in order to display an image on each pixel P of the panel 110. The data drive device 120 may include at least one data driver integrated circuit, and the at least one data driver integrated circuit may be connected to a bonding pad of the panel 110 by a tape-automated-bonding (TAB) method or a chip-on-glass (COG) method or may be formed directly on the panel 110. If necessary, the data driver integrated circuit may be integrated with the panel 110. In addition, the data drive device 120 may be provided by a chip-on-film (COF) method.

The gate drive device 130 may supply a scan signal to the gate line GL in order to turn on or off a transistor disposed at each pixel P. The gate drive device 130 may be disposed at one side of the panel 110, as in FIG. 1, or may be divided into two parts so as to be disposed at both sides of the panel 110 depending on the driving method. Further, the gate drive device 130 may include at least one gate driver integrated circuit, and the at least one gate driver integrated circuit may be connected to the bonding pad of the panel 110 by the TAB method or the COG method or may be provided in a gate-in-panel (GIP) type to be formed directly on the panel 110. If necessary, the gate driver integrated circuit may be integrated with the panel 110. In addition, the gate drive device 130 may be provided by a chip-on-film (COF) method.

The panel 110 may include only a display panel and may further include a touch panel (touch screen panel: TSP). Here, the display panel and the touch panel may share some components. For example, the touch electrode EL which is used to detect a touch in the touch panel may be used as a common voltage electrode to supply a common voltage for the display panel. Although this panel 110 is also referred to as an integrated panel in that the display panel and the touch panel share some components with each other, the present disclosure is not limited thereto. Further, although an in-cell panel is known as a type in which a display panel and a touch panel are integrated, the in-cell panel is merely an example of the panel 110. A panel to which the present disclosure is applied is not limited to the in-cell panel.

A plurality of touch electrodes EL may be disposed on the panel 110, and the touch sensing device 140 may drive the touch electrodes EL using a driving signal. The touch sensing device 140 may generate a sensing value on the touch electrodes EL according to a response signal formed in the touch electrodes EL corresponding to the driving signal. The touch sensing device 140 may calculate the coordinates of a touch using the sensed value of the plurality of touch electrodes EL disposed on the pane 1110 and may transmit the calculated coordinates of the touch to another device, for example, a host device, for use.

Conventionally, when a defect occurs in a touch electrode EL, a touch panel is discarded. In this case, losses due to the disposal of the touch panel are incurred. Such losses may increase when a touch panel and a display panel are integrated into a single form. For example, when a touch electrode EL is used as a common voltage electrode in the display panel, if a defect occurs in the touch electrode EL, the entire panel including the touch panel and the display panel needs to be discarded because the touch panel and the display panel are integrated with each other.

Figure 2:
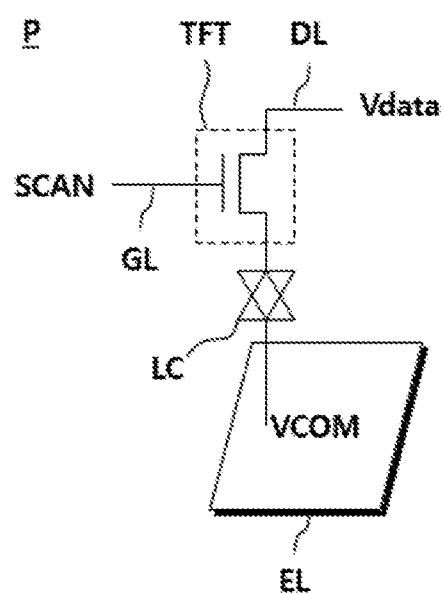
FIG. 2 illustrates the internal configuration of a pixel where a touch electrode is used as a common voltage electrode according to an exemplary embodiment.

FIG. 2 illustrates the internal configuration of a pixel where a touch electrode is used as a common voltage electrode according to an exemplary embodiment.

Referring to FIG. 2, a pixel P may include a transistor TFT, liquid crystals LC, and a common voltage electrode VCOM.

A gate terminal of the transistor TFT may be connected to a gate line GL, a drain terminal thereof may be connected to a data line DL, and a source terminal thereof may be connected to the liquid crystals LC.

When a scan signal SCAN corresponding to a turn-on voltage is supplied to the gate terminal through the gate line GL, the drain terminal and the source terminal of the transistor TFT are made conductive, and a data voltage Vdata is supplied to the liquid crystals LC.

A common voltage may be supplied to the common voltage electrode VCOM. The liquid crystals LC may be controlled according to the difference between the common voltage and the data voltage Vdata, thereby adjusting the brightness of the pixel P.

The common voltage electrode VCOM may be the same electrode as the touch electrode EL driven by the touch sensing device (see 140 in FIG. 1) described with reference to FIG. 1.

When one electrode is used as both the touch electrode EL and the common voltage electrode VCOM, it is impossible to separately replace or discard only a touch panel, and thus losses due to disposal may further increase.

Figure 3:
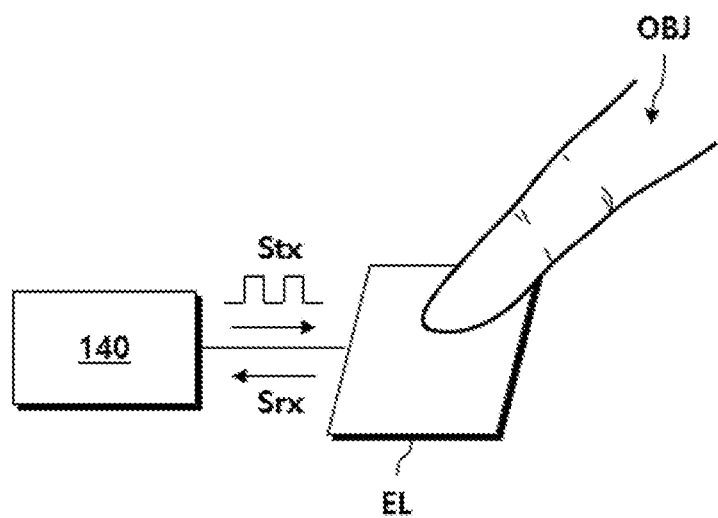
FIG. 3 illustrates a touch sensing device driving a touch electrode according to an exemplary embodiment.

FIG. 3 illustrates a touch sensing device driving a touch electrode according to an exemplary embodiment.

Referring to FIG. 3, the touch sensing device 140 may drive a touch electrode EL using a driving signal Stx and may sense the touch or proximity of an external object OBJ to a panel according to a response signal Srx formed on the touch electrode EL corresponding to the driving signal Stx.

Here, the touch sensing device 140 employ a capacitive touch mode of recognizing the proximity or touch of the object OBJ by detecting the capacitance of the touch electrode EL or a change in the capacitance.

The capacitive touch mode may be classified, for example, into a mutual capacitive touch mode and a self-capacitive touch mode.

In the mutual capacitive touch mode as one type of the capacitive touch mode, a touch driving signal Stx is applied to one touch electrode, and then another touch electrode coupled with the one touch electrode is sensed. In the mutual capacitive touch mode, a value sensed at the other touch electrode varies depending on the proximity or touch of the object OBJ, such as a finger, a pen, or the like. The mutual capacitive touch mode may detect the occurrence of a touch and the coordinates of a touch using this sensed value.

In the self-capacitive touch mode as another type of the capacitive touch mode, a touch driving signal Stx is applied to one touch electrode, and then the one touch electrode is detected. In the self-capacitive touch mode, a value sensed at the one touch electrode varies depending on the proximity or touch of the object OBJ, such as a finger, a pen, or the like. The self-capacitive touch mode may detect the occurrence of a touch and the coordinates of a touch using this sensed value. In the self-capacitive touch mode, a touch electrode to which a touch driving signal Stx is applied and a touch electrode to be sensed are the same.

The exemplary embodiment may be applied to both the mutual capacitive touch mode and the self-capacitive touch mode. In examples to be illustrated below, for convenience of description, an exemplary embodiment will be described where the self-capacitive touch mode is applied.

When a defect occurs in the touch electrode, the response signal Srx is changed. The touch sensing device 140 may determine whether a defect occurs in the touch electrode EL using a sensed value according to the response signal Srx.

Figure 4:
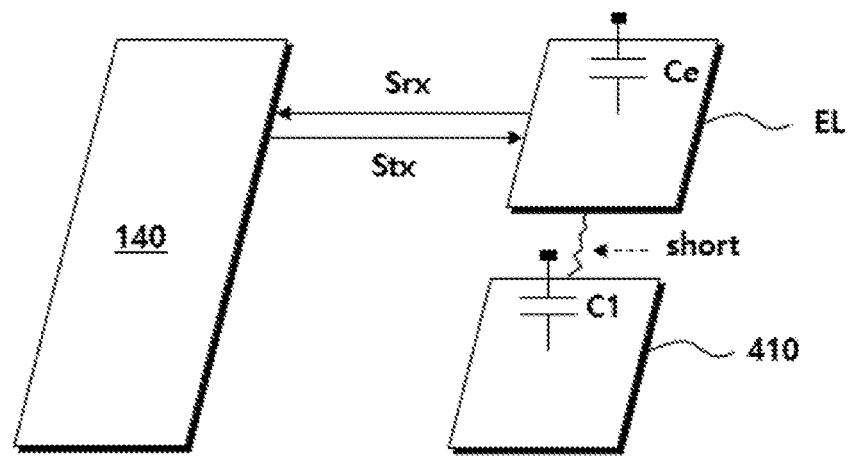
FIG. 4 illustrates the occurrence of a defect in a touch electrode according to an exemplary embodiment.

FIG. 4 illustrates the occurrence of a defect in a touch electrode according to an exemplary embodiment.

Referring to FIG. 4, when there is no touch or proximity of an external object, base capacitance Ce may be formed in a touch electrode EL.

A touch sensing device 140 may supply a driving signal Stx to the touch electrode EL and may receive a response signal Srx from the touch electrode EL. The touch sensing device 140 may identify a sensed value corresponding to the capacitance of the touch electrode EL using the response signal Srx. When the sensed value is different from a base sensed value corresponding to the base capacitance Ce, the touch sensing device 140 may recognize that an external object approaches or touches the touch electrode EL.

However, the sensed value of the touch sensing device 140 may be different from the base sensed value in a case where an external object does not approach or touch the touch electrode EL or is estimated not to approach or touch the touch electrode EL. In this case, the touch sensing device 140 may determine that a defect has occurred in the touch electrode EL. For example, the touch sensing device 140 may identify the sensed value corresponding to the capacitance of the touch electrode EL using the response signal Srx formed in the touch electrode EL, in which when the sensed value is different from the base sensed value corresponding to the base capacitance Ce, the touch sensing device 140 may determine that a defect has occurred in the touch electrode EL.

When the touch electrode EL is short-circuited with a peripheral conductor 410, the capacitance sensed through the response signal Srx may increase or decrease according to the connection relationship between the capacitance Ce of the touch electrode EL and the capacitance C1 of the peripheral conductor 410. For example, when the capacitance Ce of the touch electrode EL and the capacitance C1 of the peripheral conductor 410 have a parallel connection relationship, the capacitance sensed through the response signal Srx may increase. The capacitance of the touch electrode EL having a defect is changed, and accordingly the value sensed by the touch sensing device 140 is also changed. The touch sensing device 140 can recognize a defect of the electrode EL using the sensed value.

According to one exemplary embodiment, when it is determined that the defect has occurred in the touch electrode EL, the touch sensing device 140 may correct the sensed value of the touch electrode EL, thereby supporting the reuse of a panel rather than discarding the panel.

The sensed value of the touch electrode EL having a defect may be corrected into the sensed value of a neighboring touch electrode. When an external object touches or approaches the panel, the state, for example, the capacitance, of touch electrodes disposed on the panel is changed, and the touch sensing device may sense the state of the touch electrodes, thereby sensing the touch or proximity of the external object. However, when the external object touches or approaches the panel, the states of a plurality of touch electrodes rather than the state of one touch electrode are simultaneously changed. The touch sensing device may correct the sensed value of the touch electrode EL having the defect using the simultaneously changed sensed values of touch electrodes disposed adjacent to the touch electrode EL having the defect.

Illustrative principles of correction applicable to an exemplary embodiment are presented with reference to FIG. 5 to FIG. 8.

Figure 5:
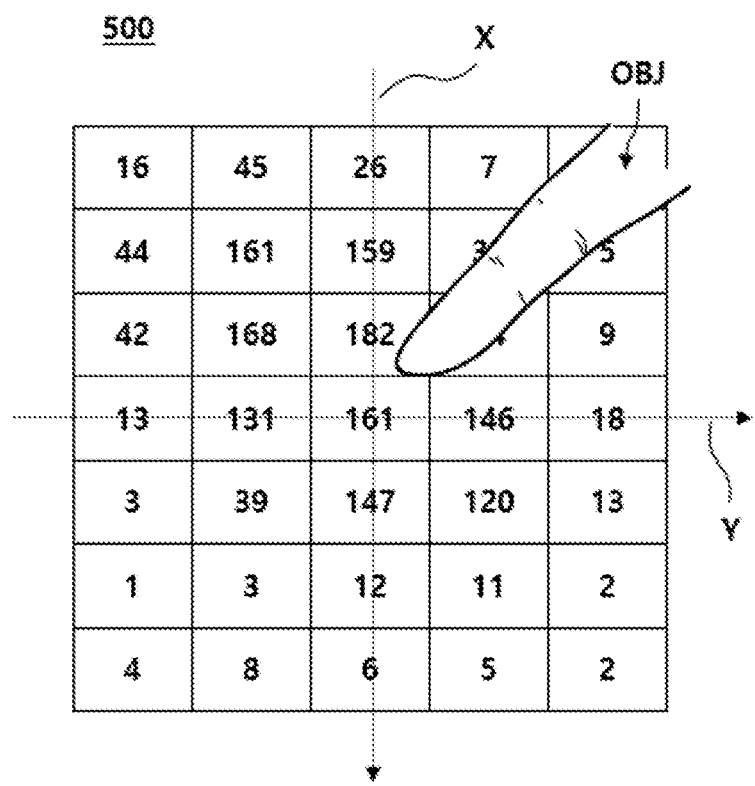
FIG. 5 illustrates a first example of a touch image.
Figure 6:
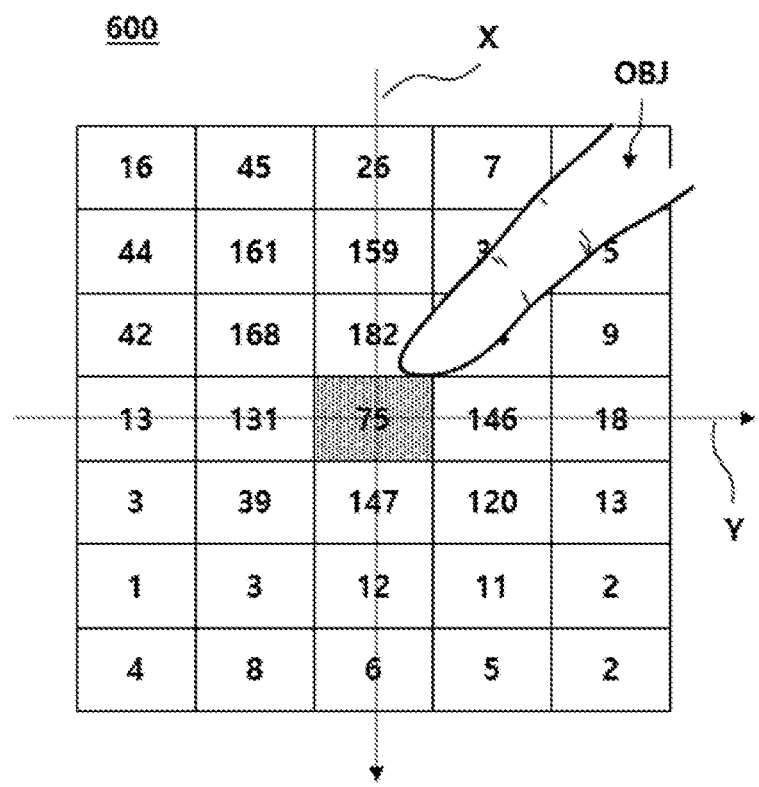
FIG. 6 illustrates a second example of a touch image.
Figure 7:
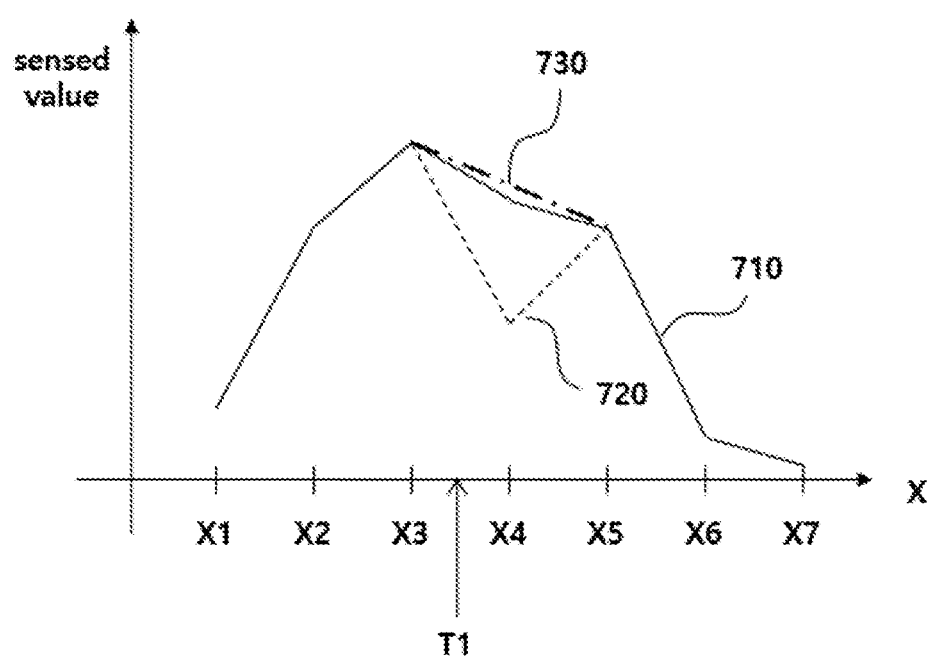
FIG. 7 is a graph illustrating the sensed value of a first line in FIG. 5 and FIG. 6.
Figure 8:
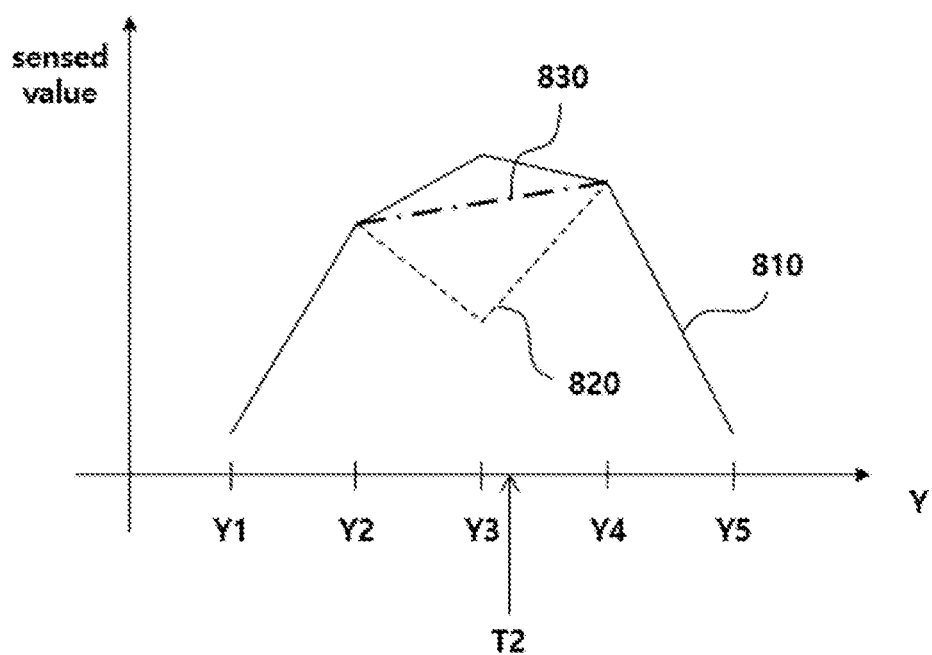
FIG. 8 is a graph illustrating the sensed value of a second line in FIG. 5 and FIG. 6.

FIG. 5 illustrates a first example of a touch image, FIG. 6 illustrates a second example of a touch image, FIG. 7 is a graph illustrating the sensed value of a first line in FIG. 5 and FIG. 6, and FIG. 8 is a graph illustrating the sensed value of a second line in FIG. 5 and FIG. 6.

Referring to the touch image of FIG. 5, which refers to a table that shows a sensed value corresponding to the position of a touch electrode, due to the touch of an external object OBJ, the sensed value of a third touch electrode in a first line X is 182, which is the highest value, and the sensed value decreases as the distance from the touch electrode increases.

A first curve 710 shown in FIG. 7 represents the sensed value in the first line X in FIG. 5. As shown in the first curve 710, sensed values identified along a line on a panel form a continuous curve, and a touch sensing device may calculate the coordinates of a touch by inputting a plurality of sensed values identified along the line into a specific model or algorithm. For example, the touch sensing device may put three or more sensed values identified along the first line X into a predetermined function, for example, a Gaussian curve, thereby calculating a first touch coordinate T1 in the direction of the first line X.

Touch coordinates on a plane may be calculated by calculating a touch coordinate in two orthogonal directions. A fourth curve 810 shown in FIG. 8 represents the sensed value in a second line Y in FIG. 5. As shown in the fourth curve 810, sensed values identified along a line on a panel form a continuous curve, and the touch sensing device may calculate the coordinates of a touch by inputting a plurality of sensed values identified along the line into a specific model or algorithm. For example, the touch sensing device may put three or more sensed values identified along the second line Y, which is perpendicular to the first line X, into a predetermined function, for example, a Gaussian curve, thereby calculating a second touch coordinate T2 in the direction of the second line Y.

When a defect occurs in a specific touch electrode, the sensed value of the touch electrode may be abnormal as shown in FIG. 6, FIG. 7, and FIG. 8. Referring to a second curve 720 in FIG. 7, the sensed value at a position of X4 where a defect occurs is abnormal. Referring to a fifth curve 820 in FIG. 8, the sensed value at a position of Y3 where a defect occurs is abnormal.

The touch sensing device may correct the sensed value of the touch electrode where the defect occurs using the sensed value of an adjacent touch electrode. As described above, since the sensed value of a touch electrode is continuous from that of an adjacent touch electrode, the sensed value of a defective touch electrode may be corrected relatively accurately using the sensed value of an adjacent touch electrode.

In one example of correction, the touch sensing device may average the sensed values of touch electrodes adjacent to the defective touch electrode, thereby generating the sensed value of the defective touch electrode. When the sensed values of two touch electrodes adjacent to the defective touch electrode along the first line X are averaged and used for correction, the sensed value of the defective touch electrode may be restored to a value similar to that in a normal state as indicated by a third curve 730 in FIG. 7. Likewise, when the sensed values of two touch electrodes adjacent to the defective touch electrode along the second line Y are averaged and used for correction, the sensed value of the defective touch electrode may be restored to a value similar to that in a normal state as indicated by a sixth curve 830 in FIG. 8.

As described above, the touch sensing device may correct the sensed value of the defective touch electrode using the sensed value of an adjacent touch electrode, thereby calculating touch coordinates with a quality similar to that of a normal panel.

Figure 9:
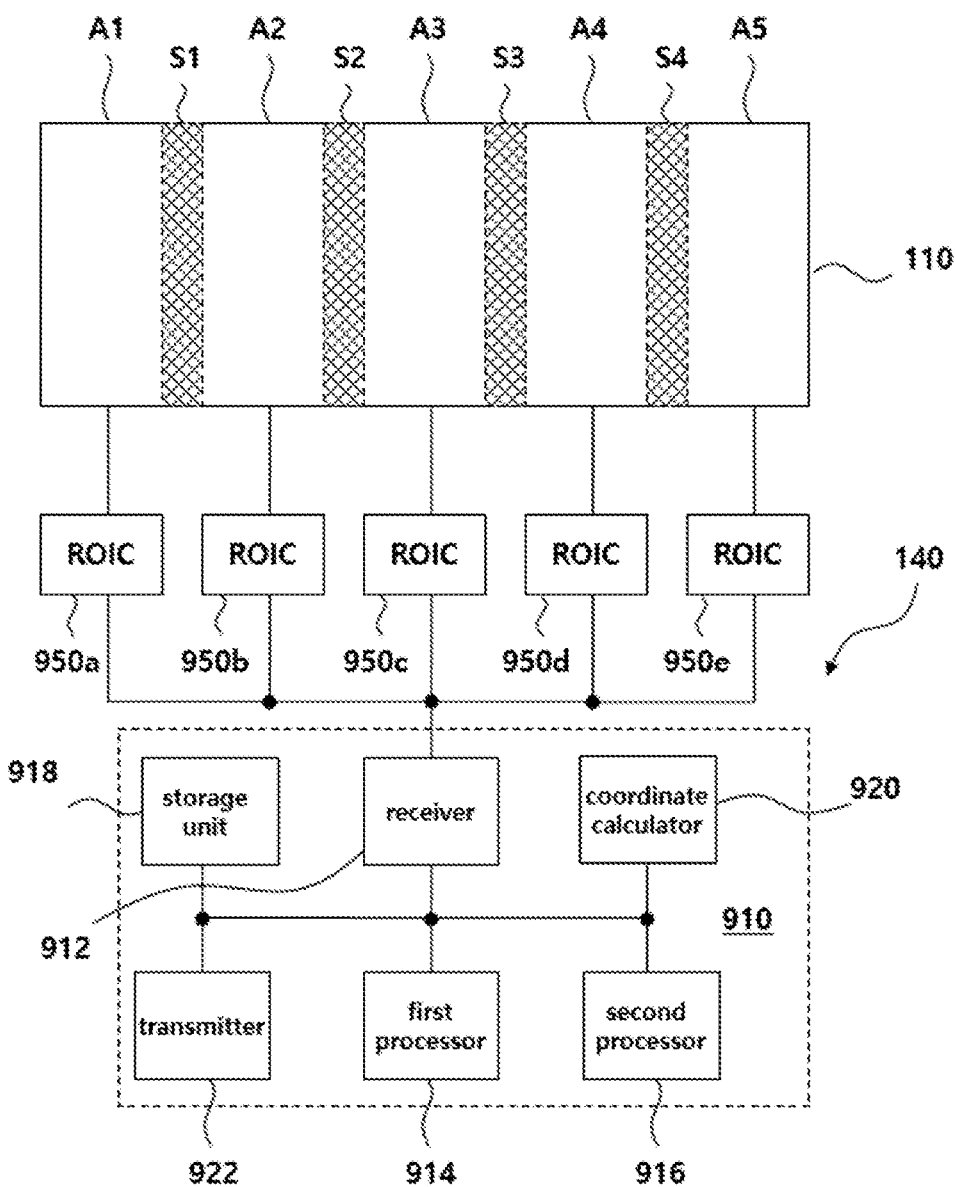
FIG. 9 illustrates the configuration of a panel and a touch sensing device according to an embodiment.

FIG. 9 illustrates the configuration of a panel and a touch sensing device according to an embodiment.

Referring to FIG. 9, the touch sensing device 140 may include a receiver 912, a transmitter 922, a storage unit 918, a coordinate calculator 920, a first processor 914, a second processor 916, and a plurality of driving circuits 950*a* to 950*e*. Here, each of the plurality of driving circuits 950*a* to 950*e* may form an integrated circuit (IC). The receiver 912, the transmitter 922, the storage unit 918, the coordinate calculator 920, the first processor 914, and the second processor 916 may be included in one touch sensing integrated circuit 910.

The plurality of driving circuits 950*a* to 950*e* may supply a driving signal to a touch electrode disposed on a panel 110 and may generate a raw sensed value using a response signal formed on the touch electrode according to the driving signal.

The plurality of driving circuits 950a to 950e may further drive a data line disposed on the panel 110.

The panel 110 may be divided into a plurality of sensing areas A1 to A5. A plurality of touch electrodes may be disposed in each of the sensing areas A1 to A5. The driving circuits 950a to 950e may drive the touch electrodes in the sensing areas A1 to A5, respectively. Adjacent sensing areas A1 to A5 may partially overlap each other, thereby forming overlapping areas S1 to S4. The overlapping areas S1 to S4 may be driven by two driving circuits 950a to 950e.

The receiver 912 may receive a raw sensed value from the driving circuits 950a to 950e.

The first processor 914 may identify a defective sensed value that satisfies a defect determination condition among the first sensed values of the plurality of touch electrodes disposed on the panel 110.

Here, the first sensed values may be raw sensed values received by the receiver 912. The first processor 914 may identify the raw sensed values of the plurality of touch electrodes disposed on the panel 110 and may identify a defective sensed value that satisfies the defect determination condition among the raw sensed values.

The first sensed values may be values generated when there is no touch or proximity of an external object to the panel 110 or when it is estimated that there is no touch or proximity of an external object. Generally, it is estimated that there is no touch or proximity of an external object at the start time of the operation, that is, within a certain time after power is supplied to the touch sensing device 140 or the panel 110.

The first sensed values may also be measured during an in-operation time rather than at the start time of the operation. The first processor 914 may generate a delta value by subtracting previously identified first sensed values from the raw sensed values. When variation in the delta value is less than or equal to a certain value, for example, a threshold, the first processor 914 may update the first sensed values. When updating the first sensed values, the first processor 914 may update the first sensed values by averaging raw sensed values obtained in a plurality of frames.

Here, the in-operation time may be the time when the touch sensing device 140 generates touch coordinates, which is not the start time.

The first processor 914 may identify a defective sensed value that satisfies the defect determination condition among the first sensed value of the plurality of touch electrodes disposed on the panel 110 when there is no touch or proximity of an external object to the panel 110, for example, at the start time of the operation or at the time when the delta value is less than or equal to a certain value.

The defect determination condition may be, for example, that there is a certain difference or greater between the sensed value of a touch electrode and the average value of the first sensed values of all the touch electrodes.

The storage unit 918 may store information indicating a touch electrode corresponding to a defective sensed value (hereinafter, "defective touch electrode"). For example, the position of each touch electrode on the panel 110 may be designated as coordinates, and the storage unit 918 may store the coordinates of the defective touch electrode on the panel 110.

The second processor 916 may correct the sensed value of the defective touch electrode, among the second sensed values of the plurality of touch electrodes disposed on the panel 110, using the sensed value of at least one touch electrode adjacent to the defective touch electrode.

The second sensed values may be sensed values from which a base sensed value is removed (hereinafter, "D-sensed value").

The touch sensing device 140, for example, the first processor 914, the second processor 916, or a third processor (not shown), may generate the base sensed value using a raw sensed value generated when there is no touch or proximity of an external object to the panel 110 (in a first time period). The touch sensing device 140 may generate the base sensed value by averaging a plurality of raw sensed values generated when there is no touch or proximity of an external object to the panel 110.

The touch sensing device 140, for example, the first processor 914, the second processor 916, or the third processor (not shown), may generate a D-sensed value by calculating the difference between the raw sensed values and the base sensed value of the plurality of touch electrodes disposed on the panel 110 in a second time period.

The second processor 916 may correct the D-sensed value of the defective touch electrode using the D-sensed value of at least one adjacent touch electrode. For example, the second processor 916 may replace the D-sensed value of the defective touch electrode with the average value of the D-sensed values of two right and left adjacent touch electrodes, with the average value of the D-sensed values of two upper and lower adjacent touch electrodes, or with the average value of the D-sensed values of four right, left, upper, and lower adjacent touch electrodes.

The coordinate calculator 920 may calculate a touch coordinate using corrected D-sensed values. The coordinate calculator 920 may calculate a touch coordinate, for example, by putting the maximum D-sensed value and the D-sensed value of a neighboring touch electrode into a specific model or algorithm.

The transmitter 922 may transmit the calculated touch coordinate to another device, for example, a host, and the host may recognize a user operation on the panel 110 using the received touch coordinate.

Figure 10:
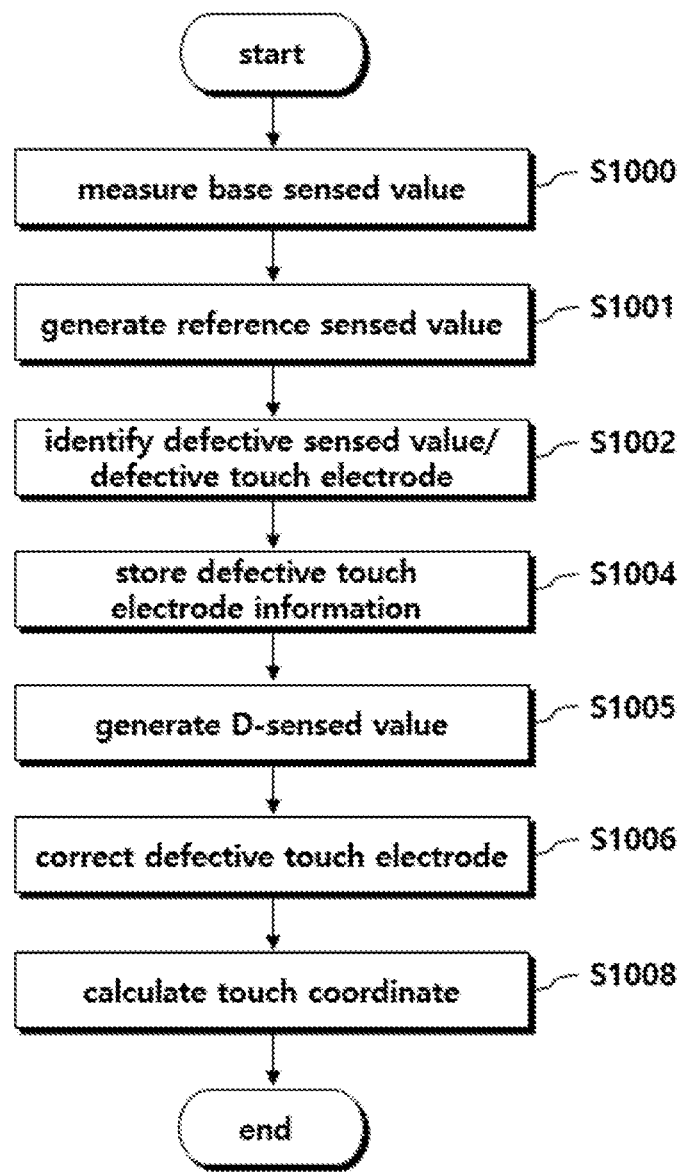
FIG. 10 is a flowchart illustrating a method of controlling a touch sensing device according to an exemplary embodiment.

FIG. 10 is a flowchart illustrating a method of controlling a touch sensing device according to an exemplary embodiment.

Referring to FIG. 10, a touch sensing device, for example, a first processor or a third processor, may measure a base sensed value (S1000). Here, the base sensed value may be a raw sensed value measured on each touch electrode when there is no touch or proximity of an external object to a panel. The touch sensing device may generate base sensed values by averaging the raw sensed values of respective touch electrodes obtained from a plurality of frames.

The touch sensing device, for example, the first processor, may generate a reference sensed value using the base sensed values of a plurality of touch electrodes disposed on the panel (S1001). Here, the reference sensed value may be a value used for a defect determination condition.

The touch sensing device, for example, the first processor, may generate a reference sensed value by averaging the base sensed values of all the touch electrodes disposed on the panel. Alternatively, the touch sensing device may generate a reference sensed value by selecting representative sensed values from among the base sensed values of all the touch electrodes and averaging the representative sensed values.

When there is a certain difference or greater between a base sensed value and the reference sensed value, the touch sensing device, for example, the first processor, may determine that the base sensed value is a defective sensed value (S1002). The touch sensing device may identify a defective touch electrode corresponding to the defective sensed value.

The touch sensing device, for example, a storage unit, may store defective touch electrode information indicating the defective touch electrode corresponding to the defective sensed value among the plurality of touch electrodes (S1004).

The touch sensing device, for example, the first processor, the second processor, or the third processor, may generate a D-sensed value (S1005). The D-sensed value is a sensed value obtained by removing a base sensed value from a raw sensed value. The touch sensing device may generate a D-sensed value by obtaining a raw sensed value and subtracting a previously stored base sensed value from the raw sensed value.

The touch sensing device, for example, the second processor, may correct a D-sensed value corresponding to the defective touch electrode among the D-sensed values of the plurality of touch electrodes disposed on the panel using the D-sensed value of at least one touch electrode adjacent to the defective touch electrode (S1006). The touch sensing device may correct the D-sensed value corresponding to the defective touch electrode when at least one D-sensed value of the D-sensed values satisfies a touch determination condition. The touch determination condition may be, for example, that a D-sensed value is larger than a preset touch determination value.

The touch sensing device, for example, a coordinate calculator, may calculate a touch coordinate using corrected D-sensed values (S1008).

Figure 11:
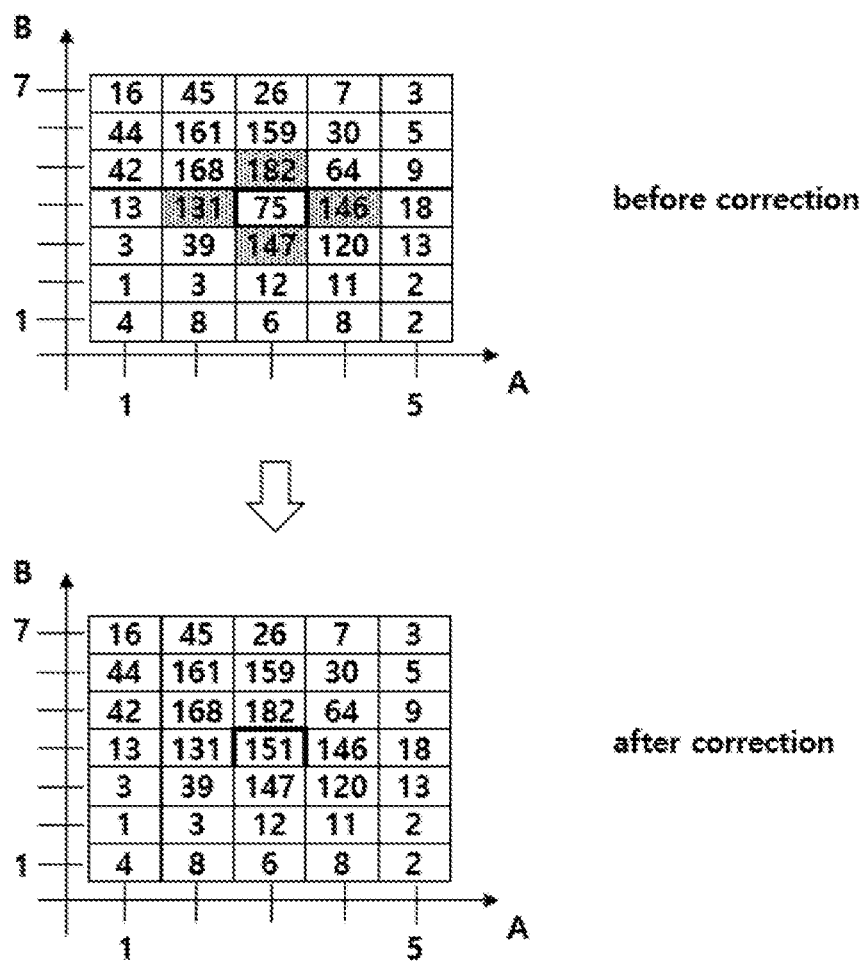
FIG. 11 illustrates a first example in which a touch sensing device corrects a defective touch electrode according to an exemplary embodiment.

FIG. 11 illustrates a first example in which a touch sensing device corrects a defective touch electrode according to an exemplary embodiment.

Referring to FIG. 11, a touch sensing device, for example, a second processor, may replace the sensed value of a defective touch electrode with the average value of sensed values of four upper, lower, right, and left touch electrodes adjacent to the defective touch electrode.

In an upper touch image of FIG. 11, a touch electrode having coordinates (A, B) corresponding to (3, 4) is a defective touch electrode. The touch sensing device may replace the sensed value of the defective touch electrode with the average value of sensed values, 182, 147, 131, and 146, of four upper, lower, right, and left touch electrodes adjacent to the defective touch electrode, which are touch electrodes corresponding to coordinates (3, 5), (3, 3), (2, 4), and (4, 4).

Figure 12:
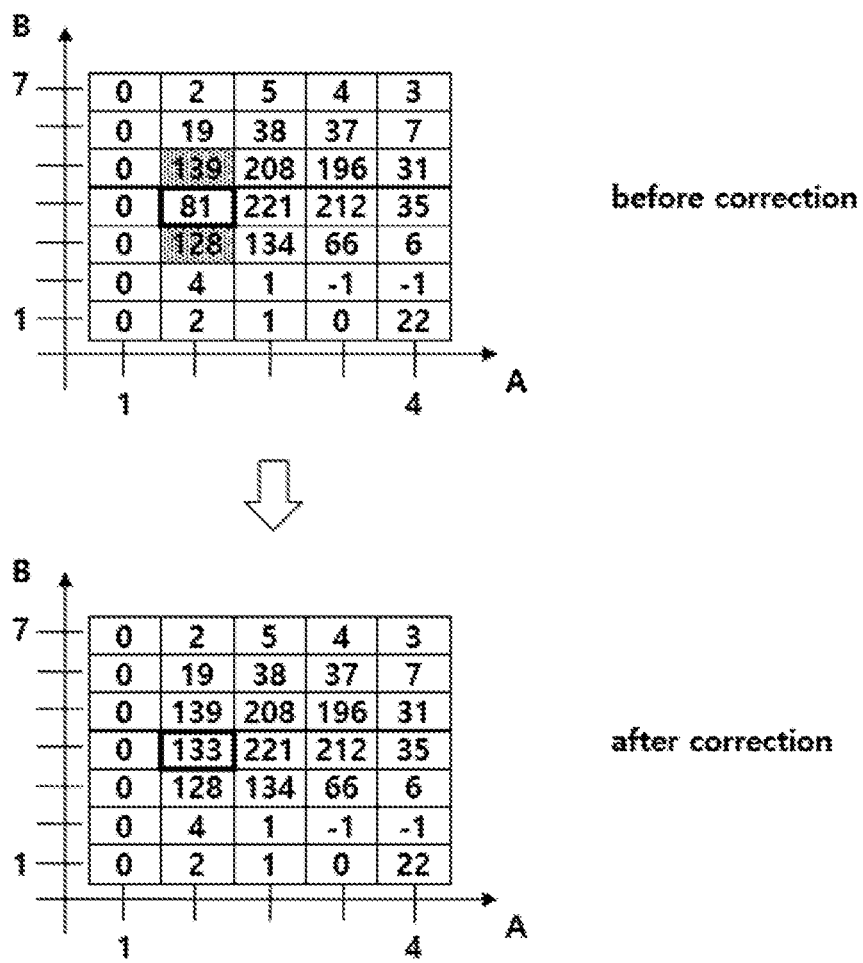
FIG. 12 illustrates a second example in which a touch sensing device corrects a defective touch electrode according to an exemplary embodiment.

FIG. 12 illustrates a second example in which a touch sensing device corrects a defective touch electrode according to an exemplary embodiment.

Referring to FIG. 12, a defective touch electrode, which is a touch electrode corresponding to coordinates (1, 4), is located on the edges of a plurality of touch electrodes. In a touch image of FIG. 12, a portion having an A coordinate of 0 is not included in touch coordinates. In this portion, there may be no touch electrode, or a dummy electrode may be disposed.

When the defective touch electrode is disposed on the edges, a touch sensing device, for example, a second processor, may replace the sensed value of the defective touch electrode with the average value of sensed values, 128 and 139, of two touch electrodes adjacent to the defective touch electrode in parallel with the edges, which are touch electrodes corresponding to coordinates (1, 3) and (1, 5).

FIG. 13 illustrates a third example in which a touch sensing device corrects a defective touch electrode according to an exemplary embodiment.

Referring to FIG. 13, a defective touch electrode, which is a touch electrode corresponding to coordinates (1, 1), is located in a corner of a plurality of touch electrodes. In a touch image of FIG. 13, a portion having an A coordinate of 0 and a portion having a B coordinate of 0 are not included in touch coordinates. In these portions, there may be no touch electrode, or a dummy electrode may be disposed.

When the defective touch electrode is disposed in the corner, a touch sensing device, for example, a second processor, may replace the sensed value of the defective touch electrode with the average value of sensed values, 147 and 149, of two touch electrodes adjacent to the defective touch electrode in first and second directions, which are touch electrodes corresponding to coordinates (1, 2) and (2, 1). Here, the first direction and the second direction may be perpendicular to each other. For example, the first direction may be a vertical direction, and the second direction may be a horizontal direction.

Figure 14:
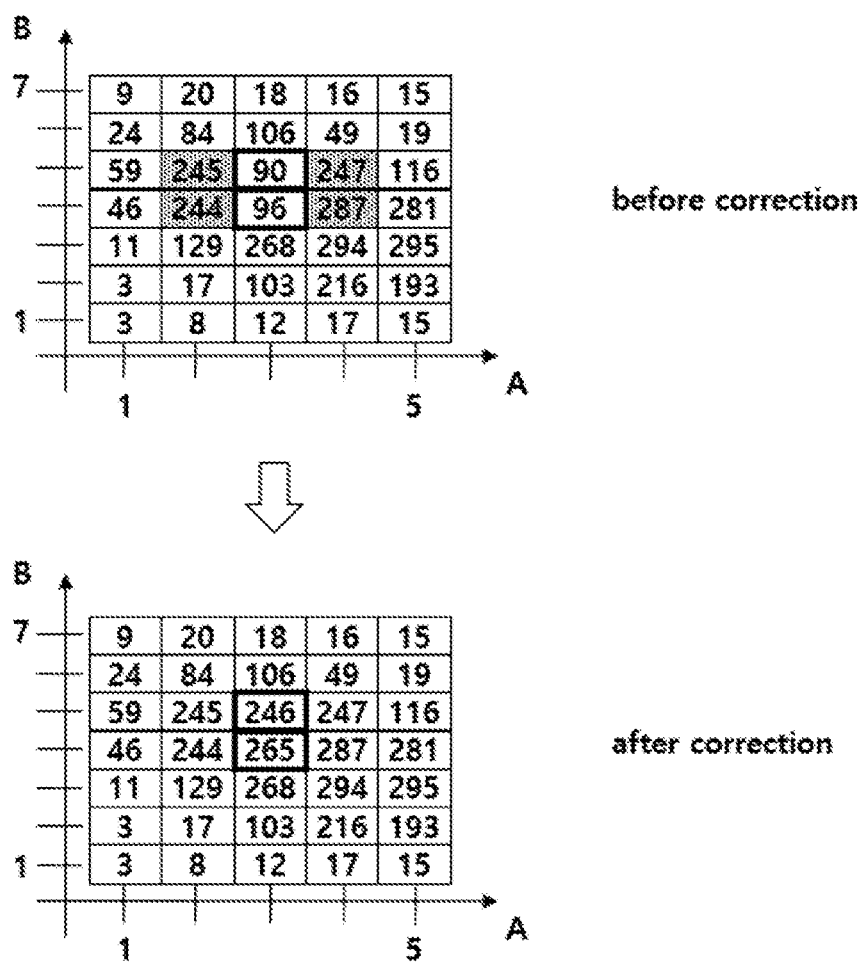
FIG. 14 illustrates a fourth example in which a touch sensing device corrects a defective touch electrode according to an exemplary embodiment.

FIG. 14 illustrates a fourth example in which a touch sensing device corrects a defective touch electrode according to an exemplary embodiment.

Referring to FIG. 14, when two defective touch electrodes, which are touch electrodes corresponding to coordinates (3, 4) and (3, 5), are adjacent to each other in a first direction, for example, a vertical direction, a touch sensing device, for example, a second processor, may replace the sensed values of the defective touch electrodes with the average value of sensed values of two touch electrodes adjacent to each of the defective touch electrodes in a second direction, for example, a horizontal direction, perpendicular to the first direction.

Figure 15:
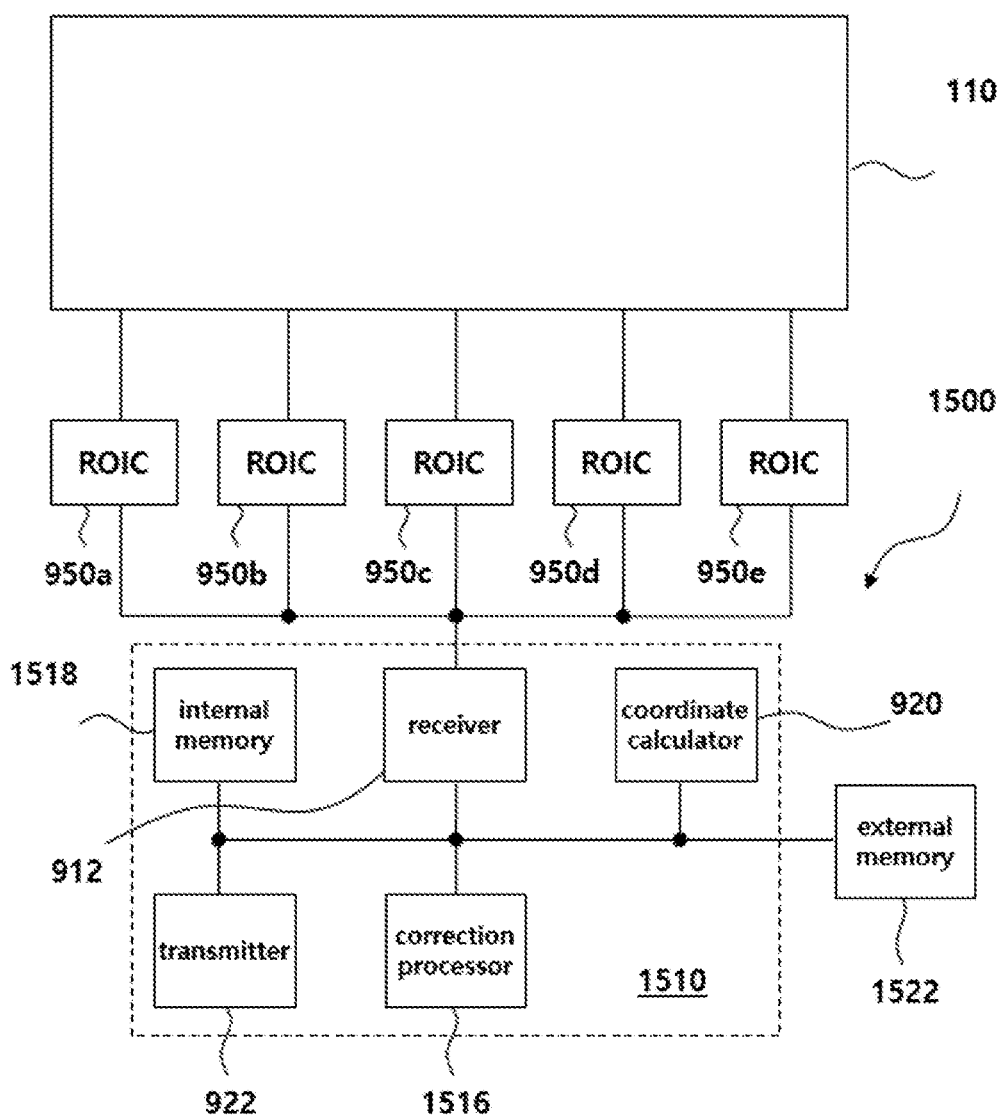
FIG. 15 illustrates the configuration of a panel and a touch sensing device according to another exemplary embodiment.

FIG. 15 illustrates the configuration of a panel and a touch sensing device according to another exemplary embodiment.

Referring to FIG. 15, the touch sensing device 1500 may include a receiver 912, a transmitter 922, an internal memory 1518, a coordinate calculator 920, a correction processor 1516, an external memory 1522, and a plurality of driving circuits 950a to 950e. Here, each of the plurality of driving circuits 950a to 950e may form an integrated circuit (IC). The receiver 912, the transmitter 922, the internal memory 1518, the coordinate calculator 920, and the correction processor 1516 may be included in one touch sensing integrated circuit 1510. The external memory 1522 may be disposed outside the touch sensing integrated circuit 1510 and may provide information to the touch sensing integrated circuit 1510.

The plurality of driving circuits 950a to 950e may supply a driving signal to a touch electrode disposed on a panel 110 and may generate a raw sensed value using a response signal formed on the touch electrode according to the driving signal. The driving signal may be, for example, a signal alternating between a first voltage and a second voltage. When the driving signal alternates between the first voltage and the second voltage, if a defect, for example, a short circuit, occurs in a touch electrode, a voltage having a voltage level different from the first voltage and the second voltage is formed on the touch electrode, and accordingly the touch electrode exhibits a sensed value different from that of a normal touch electrode.

The receiver 912 may receive a raw sensed value from the driving circuits 950a to 950e.

The correction processor 1516 may correct a sensed value corresponding to a defective touch electrode among the sensed values of a plurality of touch electrodes disposed on the panel using the sensed value of at least one touch electrode adjacent to the defective touch electrode. Here, a sensed value may be generated by subtracting a base sensed value from a raw sensed value.

The external memory 1522 may store information indicating a defective touch electrode among the plurality of touch electrodes disposed on the panel. The correction processor 1516 may identify a defective touch electrode through this information and may identify a sensed value to correct. Various parameters may be used in a calculation process of the correction processor 1516, and the values of these parameters may be stored in the internal memory 1518.

The coordinate calculator 920 may calculate a touch coordinate using corrected sensed values. The coordinate calculator 920 may calculate a touch coordinate, for example, by putting the maximum sensed value and the sensed value of a neighboring touch electrode into a specific model or algorithm.

The transmitter 922 may transmit the calculated touch coordinate to another device, for example, a host, and the host may recognize a user operation on the panel 110 using the received touch coordinate.

The external memory 1522 may include an interface capable of recording information in an internal cell according to an externally input signal. The panel 110 may be inspected during a manufacturing process. In this inspection, a defective touch electrode of the panel 110 may be identified. Here, a device involved in the inspection may identify the defective touch electrode of the panel 110 and may transmit information indicating the defective touch electrode to the external memory 1522 through the interface to be recorded in the external memory 1522.

The touch sensing device 1500 may correct the defective touch electrode using the information recorded in the external memory 1522 during the manufacturing process.

The foregoing exemplary embodiment shows that a defective touch electrode is corrected by averaging the sensed values of adjacent touch electrodes. In an alternative embodiment, a defective touch electrode may be corrected by differently processing the sensed values of adjacent touch electrodes.

Figure 16:
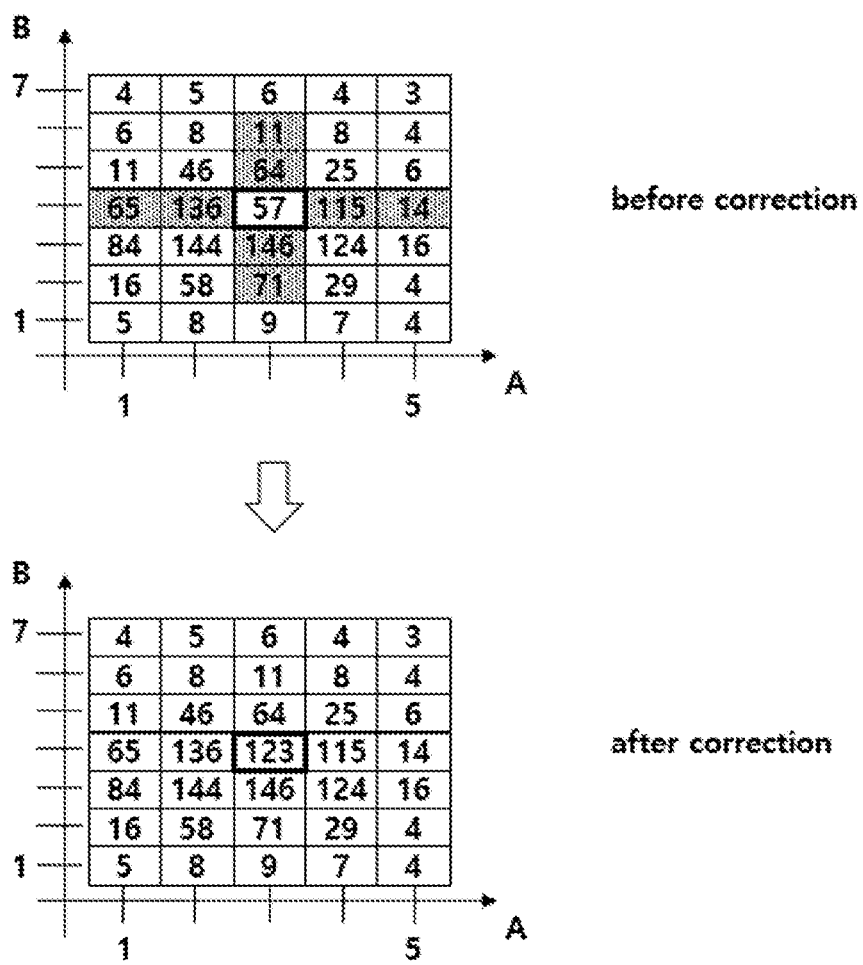
FIG. 16 illustrates a first example in which a touch sensing device corrects a defective touch electrode according to another exemplary embodiment.

FIG. 16 illustrates a first example in which a touch sensing device corrects a defective touch electrode according to another exemplary embodiment.

Referring to FIG. 16, a touch sensing device, for example, a second processor, may generate a first preliminary value by putting the sensed values of four upper and lower adjacent touch electrodes of a defective touch electrode into a B-spline equation, may generate a second preliminary value by putting the sensed values of four right and left adjacent touch electrodes into the B-spline equation, and may replace the sensed value of the defective touch electrode with the average value of the first preliminary value and the second preliminary value.

In an upper touch image of FIG. 16, a touch electrode having coordinates (A, B) corresponding to (3, 4) is the defective touch electrode. The touch sensing device may calculate the first preliminary value by putting the sensed values, 11, 64, 146, and 71, of the four upper and lower adjacent touch electrodes of the defective touch electrode, which are touch electrodes corresponding to coordinates (3, 6), (3, 5), (3, 3), and (3, 2), into the B-spline equation.

$$f1(x)=$$

$$\tfrac{1}{2}*|x|^3-|x|^2+\tfrac{2}{3}, \ (0 \cdot |x|<1)$$

$$-\tfrac{1}{6}*|x|^3+|x|^2-2*|x|+4/3, \ (1 \le |x|<2)$$

$$(2 \le |x|) \qquad \text{[Equation 1]}$$

Equation 1 is an illustrative equation for calculating a weight for the B-spline equation, in which 0.5 may be put into |x| for a touch electrode next to the defective touch electrode, and 1 may be put into |x| for a touch electrode positioned one touch electrode away from the defective touch electrode.

According to one example of the B-spline equation, the sensed values of the four adjacent touch electrodes are multiplied by the respective weights f1(x) and then are added together. Accordingly, the first preliminary value is calculated as follows.

First preliminary value=0.1667*11+0.4792*64+ 0.4792*146+0.1667*71=114

The touch sensing device may calculate the second preliminary value by putting the sensed values, 65, 136, 115, and 14, of the four right and left adjacent touch electrodes of the defective touch electrode, which are touch electrodes corresponding to coordinates (1, 4), (2, 4), (4, 4), and (5, 4), into the B-spline equation.

According to the B-spline equation described above, the second preliminary value is calculated as follows.

Second preliminary value=0.1667*65+0.4792*136+ 0.4792*115+0.1667*14=132

The touch sensing device may calculate a corrected value by averaging the first preliminary value and the second preliminary value.

Corrected value=(114+132)/2=123

The touch sensing device may correct the defective touch electrode using the corrected value.

In examples to be described with reference to FIG. 17 to FIG. 19, a weight for the B-spline equation may be calculated by Equation 1.

Figure 17:
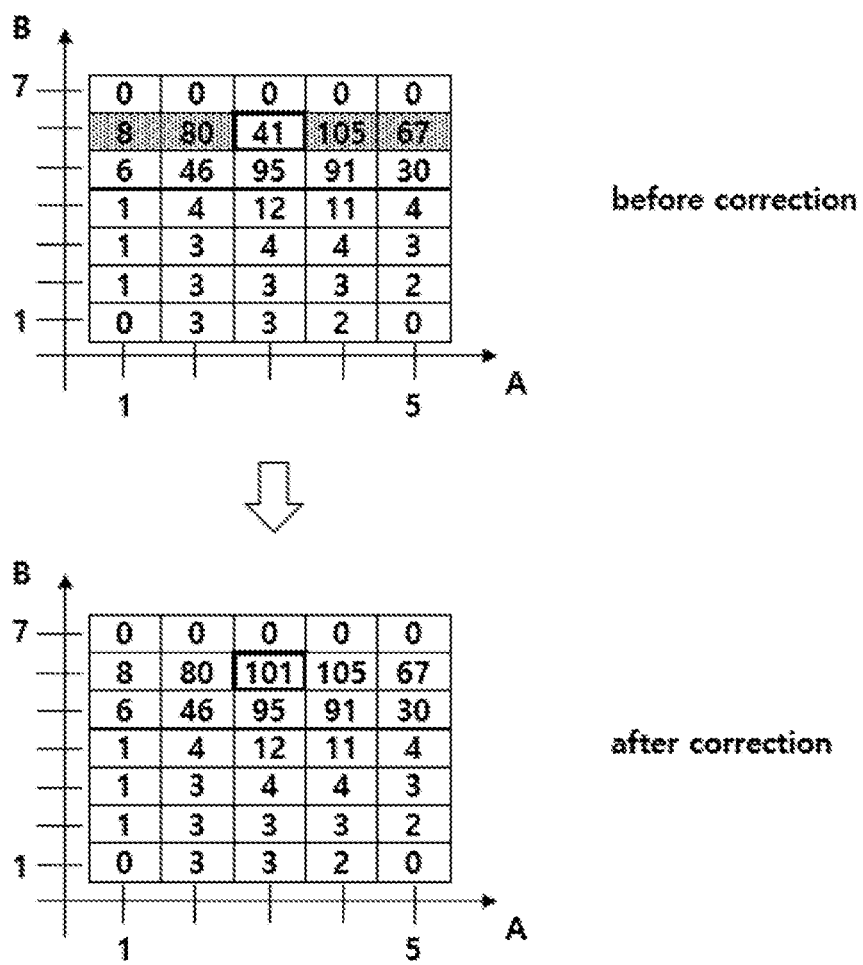
FIG. 17 illustrates a second example in which a touch sensing device corrects a defective touch electrode according to another exemplary embodiment.

FIG. 17 illustrates a second example in which a touch sensing device corrects a defective touch electrode according to another exemplary embodiment.

Referring to FIG. 17, a defective touch electrode, which is a touch electrode corresponding to coordinates (3, 6), is located on the edges of touch electrodes. In a touch image of FIG. 17, a portion having a B coordinate of 7 is not included in touch coordinates. In this portion, there may be no touch electrode, or a dummy electrode may be disposed.

When the defective touch electrode is disposed on the edges, a touch sensing device, for example, a second processor, may replace the sensed value of the defective touch electrode with a value obtained by putting the sensed values, 8, 80, 105, and 67, of four touch electrodes adjacent to the defective touch electrode in parallel with the edges, which are touch electrodes corresponding to coordinates (1, 6), (2, 6), (4, 6), and (5, 6), into the B-spline equation.

Corrected value=0.1667*8+0.4792*80+0.4792*105+ 0.1667*67=101

Figure 18:
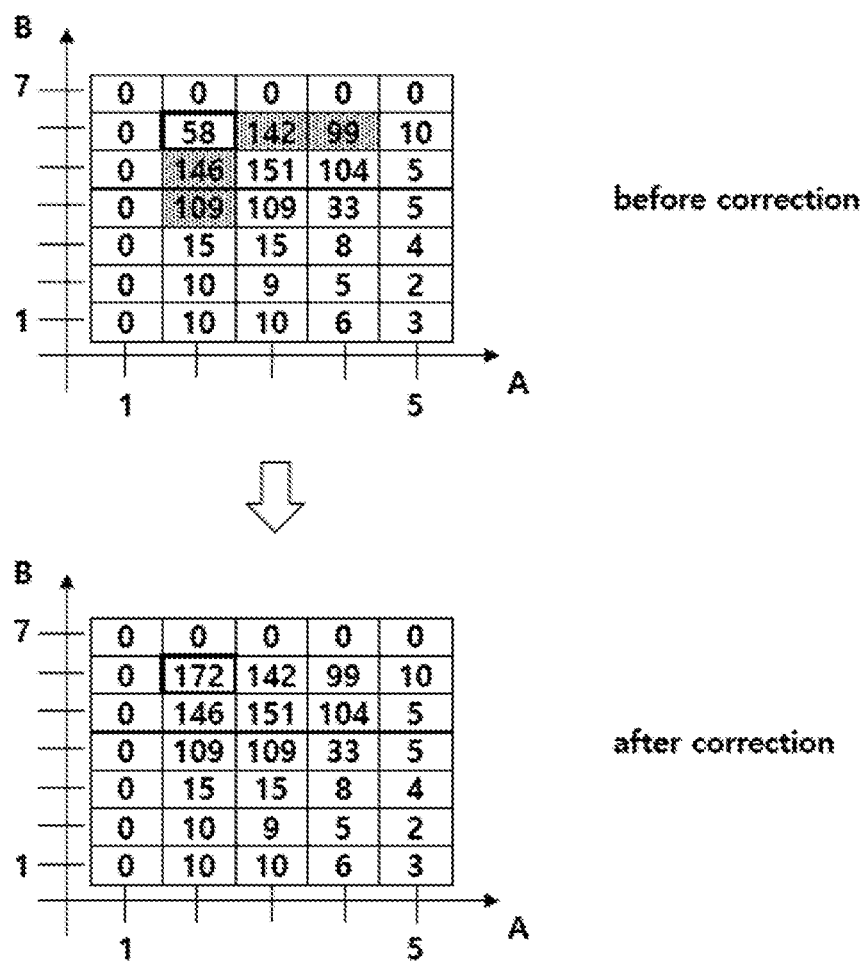
FIG. 18 illustrates a third example in which a touch sensing device corrects a defective touch electrode according to another exemplary embodiment.

FIG. 18 illustrates a third example in which a touch sensing device corrects a defective touch electrode according to another exemplary embodiment.

Referring to FIG. 18, a defective touch electrode, which is a touch electrode corresponding to coordinates (2, 6), is located in a corner of touch electrodes. In a touch image of FIG. 18, a portion having an A coordinate of 1 and a portion having a B coordinate of 7 are not included in touch coordinates. In these portions, there may be no touch electrode, or a dummy electrode may be disposed.

When the defective touch electrode is disposed in the corner, a touch sensing device, for example, a second processor, may replace the sensed value of the defective touch electrode with a value obtained by putting the sensed values, 109, 146, 142, and 99, of four touch electrodes adjacent to the defective touch electrode in the first and second directions, which are touch electrodes corresponding to coordinates (2, 4), (2, 5), (3, 6), and (4, 6), into the B-spline equation.

Corrected value=0.1667*109+0.4792*146+ 0.4792*142+0.1667*99=172

Figure 19:
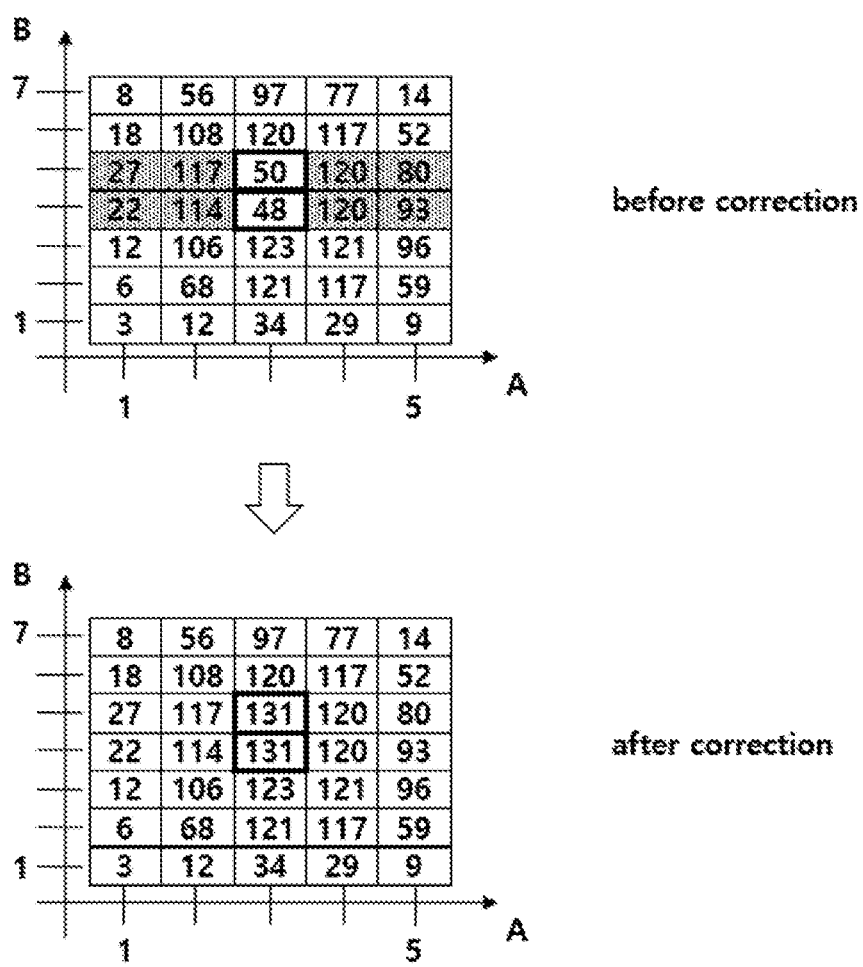
FIG. 19 illustrates a fourth example in which a touch sensing device corrects a defective touch electrode according to another exemplary embodiment.

FIG. 19 illustrates a fourth example in which a touch sensing device corrects a defective touch electrode according to another exemplary embodiment.

Referring to FIG. 19, when two defective touch electrodes, which are touch electrodes corresponding to coordinates (3, 4) and (3, 5), are adjacent to each other in a first direction, for example, a vertical direction, a touch sensing device, for example, a second processor, may replace the sensed values of the defective touch electrodes with a value obtained by putting the sensed values of four touch electrodes adjacent to each of the defective touch electrodes in a second direction, for example, a horizontal direction, perpendicular to the first direction into the B-spline equation.

Corrected value of first coordinates (3,4) =0.1667*27+0.4792*117+0.4792*120+ 0.1667*80=131

Corrected value of second coordinates (3,5) =0.1667*22+0.4792*114+0.4792*120+ 0.1667*93=131

Although the examples of correcting a defective touch electrode by applying four adjacent touch electrodes to the B-spline equation have been illustrated, the number of touch electrodes applied to the B-spline equation may be changed according to the exemplary embodiment. Here, the equation for the weight may also be changed according to the number of touch electrodes to be applied to the B-spline equation.

Figure 20:
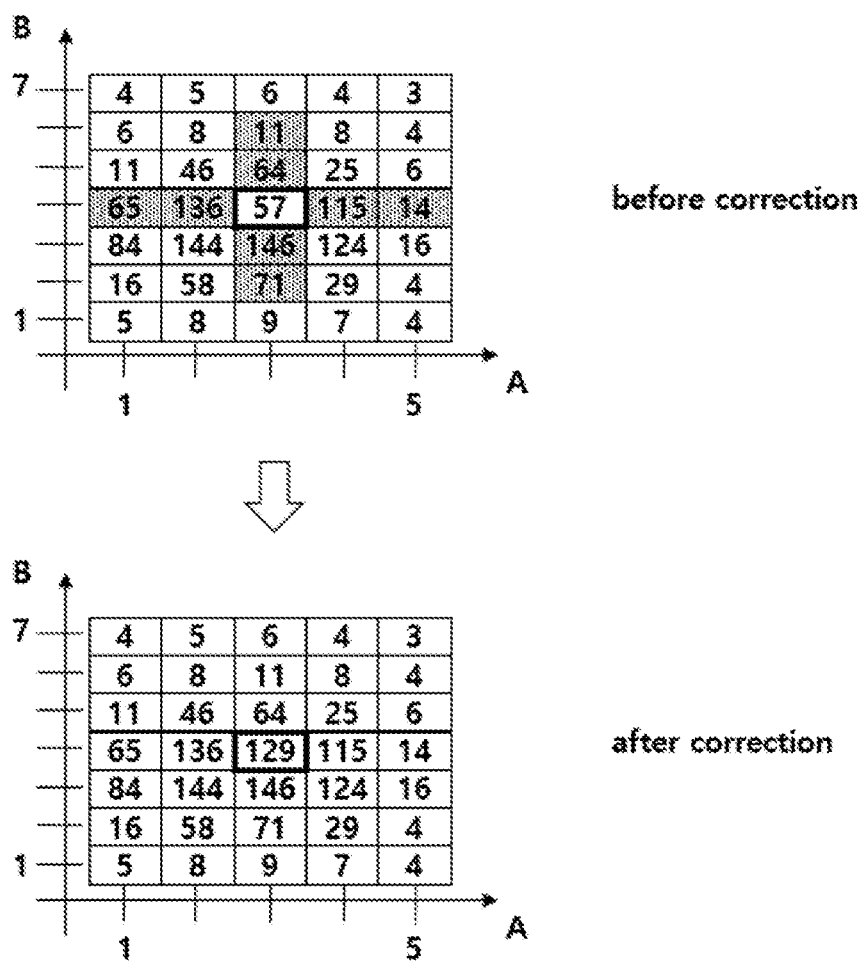
FIG. 20 illustrates a fifth example in which a touch sensing device corrects a defective touch electrode according to another exemplary embodiment.

FIG. 20 illustrates a fifth example in which a touch sensing device corrects a defective touch electrode according to another exemplary embodiment.

Referring to FIG. 20, a touch sensing device, for example, a second processor, may generate a first preliminary value by putting the sensed values of four upper and lower adjacent touch electrodes of a defective touch electrode into a bicubic equation, may generate a second preliminary value by putting the sensed values of four right and left adjacent touch electrodes into the bicubic equation, and may replace the sensed value of the defective touch electrode with the average value of the first preliminary value and the second preliminary value.

In an upper touch image of FIG. 20, a touch electrode having coordinates (A, B) corresponding to (3, 4) is the defective touch electrode. The touch sensing device may calculate the first preliminary value by putting the sensed values, 11, 64, 146, and 71, of the four upper and lower adjacent touch electrodes of the defective touch electrode, which are touch electrodes corresponding to coordinates (3, 6), (3, 5), (3, 3), and (3, 2), into the bicubic equation.

$f2(x)=$ $(a+2)*|x|^3-(a+3)*|x|^2+1, (0 \leq |x| < 1)$ $a*|x|^3-5*a*|x|^2+8*a*|x|-4*a, (1 \leq |x| < 2)$ $(2 \leq |x|)$ [Equation 2]

Equation 2 is an illustrative equation for calculating a weight for the bicubic equation, in which 0.5 may be put into $|x|$ for a touch electrode next to the defective touch electrode, and 1 may be put into $|x|$ for a touch electrode positioned one touch electrode away from the defective touch electrode. In Equation 2, a may be −0.5.

According to one example of the bicubic equation, the sensed values of the four adjacent touch electrodes are multiplied by the respective weights f2(x) and then are added together. Accordingly, the first preliminary value is calculated as follows.

First preliminary value=0*11+0.5625*64+ 0.5625*146+0*71=118

The touch sensing device may calculate the second preliminary value by putting the sensed values, 65, 136, 115, and 14, of the four right and left adjacent touch electrodes of the defective touch electrode, which are touch electrodes corresponding to coordinates (1, 4), (2, 4), (4, 4), and (5, 4), into the bicubic equation.

According to the bicubic equation described above, the second preliminary value is calculated as follows.

Second preliminary value=0*65+0.5625*136+ 0.5625*115+0*14=141

The touch sensing device may calculate a corrected value by averaging the first preliminary value and the second preliminary value.

Corrected value=(118+141)/2=129

The touch sensing device may correct the defective touch electrode using the corrected value.

In examples to be described with reference to FIG. 21 to FIG. 23, a weight for the bicubic equation may be calculated by Equation 2.

Figure 21:
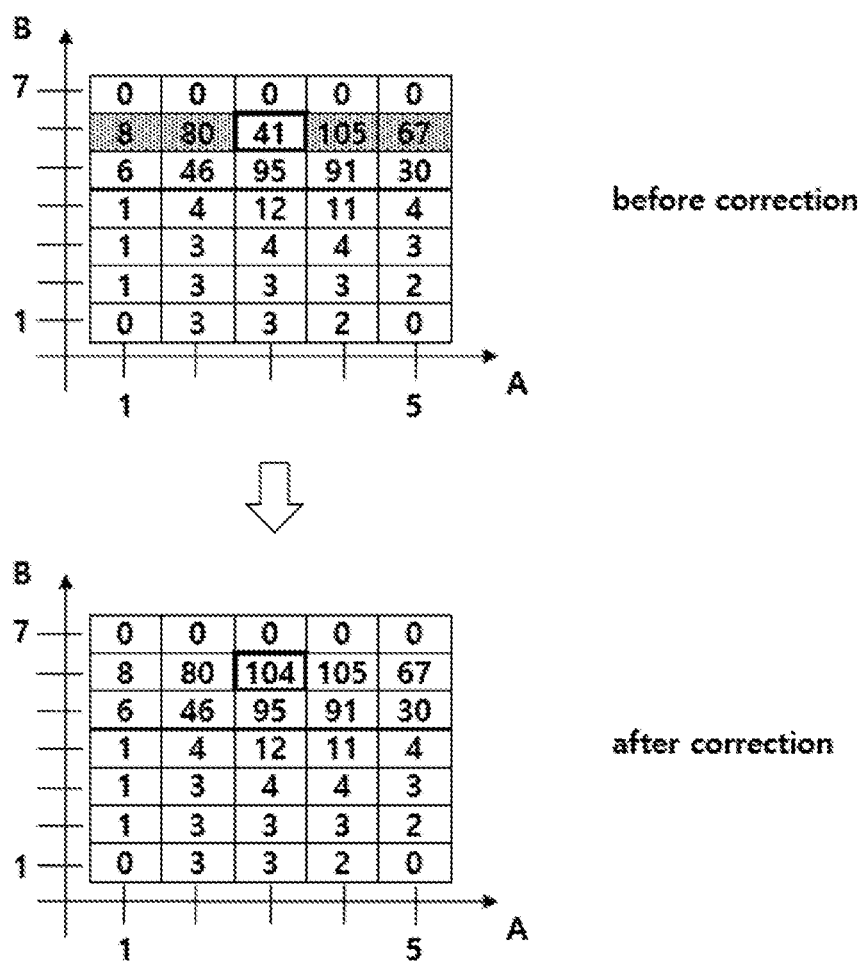
FIG. 21 illustrates a sixth example in which a touch sensing device corrects a defective touch electrode according to another exemplary embodiment.

FIG. 21 illustrates a sixth example in which a touch sensing device corrects a defective touch electrode according to another exemplary embodiment.

Referring to FIG. 21, a defective touch electrode, which is a touch electrode corresponding to coordinates (3, 6), is located on the edges of touch electrodes. In a touch image of FIG. 21, a portion having a B coordinate of 7 is not included in touch coordinates. In this portion, there may be no touch electrode, or a dummy electrode may be disposed.

When the defective touch electrode is disposed on the edges, a touch sensing device, for example, a second processor, may replace the sensed value of the defective touch electrode with a value obtained by putting the sensed values, 8, 80, 105, and 67, of four touch electrodes adjacent to the defective touch electrode in parallel with the edges, which are touch electrodes corresponding to coordinates (1, 6), (2, 6), (4, 6), and (5, 6), into the bicubic equation.

Corrected value=0*8+0.5625*80+0.5625*105+ 0*67=104

Figure 22:
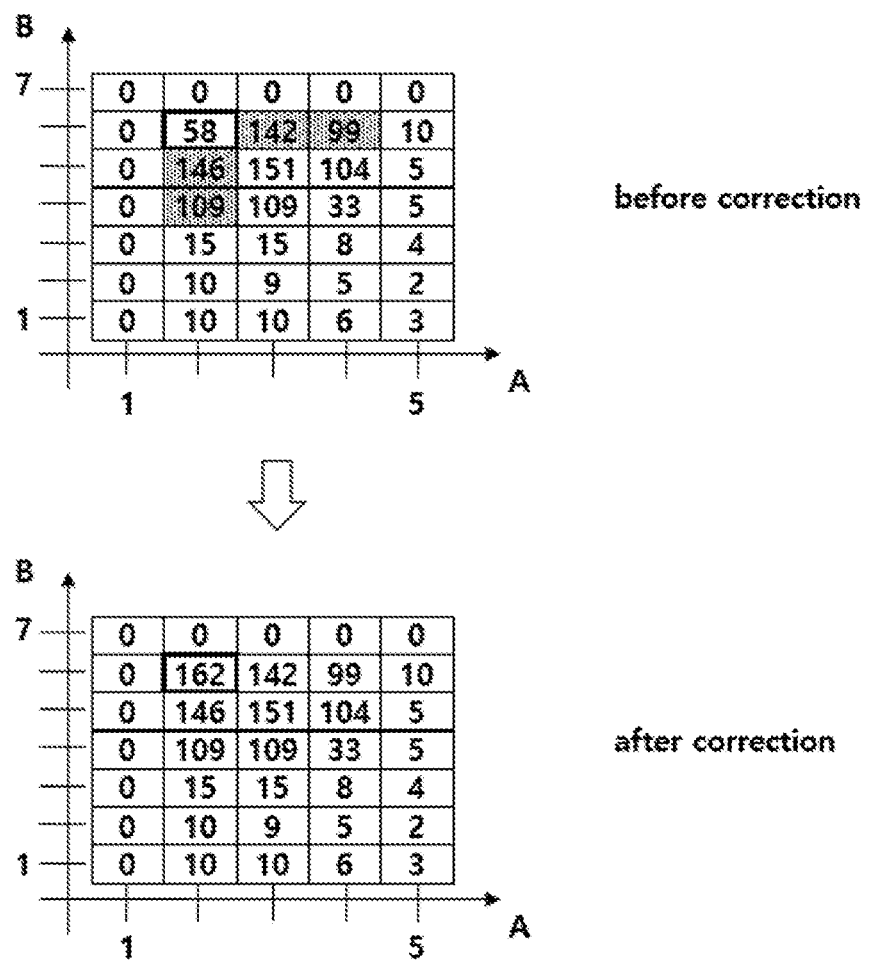

FIG. 22 illustrates a seventh example in which a touch sensing device corrects a defective touch electrode according to another exemplary embodiment.

Referring to FIG. 22, a defective touch electrode, which is a touch electrode corresponding to coordinates (2, 6), is located in a corner of touch electrodes. In a touch image of FIG. 22, a portion having an A coordinate of 1 and a portion having a B coordinate of 7 are not included in touch coordinates. In these portions, there may be no touch electrode, or a dummy electrode may be disposed.

When the defective touch electrode is disposed in the corner, a touch sensing device, for example, a second processor, may replace the sensed value of the defective touch electrode with a value obtained by putting the sensed values, 109, 146, 142, and 99, of four touch electrodes adjacent to the defective touch electrode in the first and second directions, which are touch electrodes corresponding to coordinates (2, 4), (2, 5), (3, 6), and (4, 6), into the bicubic equation.

Corrected value=0*109+0.5625*146+0.5625*142+ 0*99=162

Figure 23:
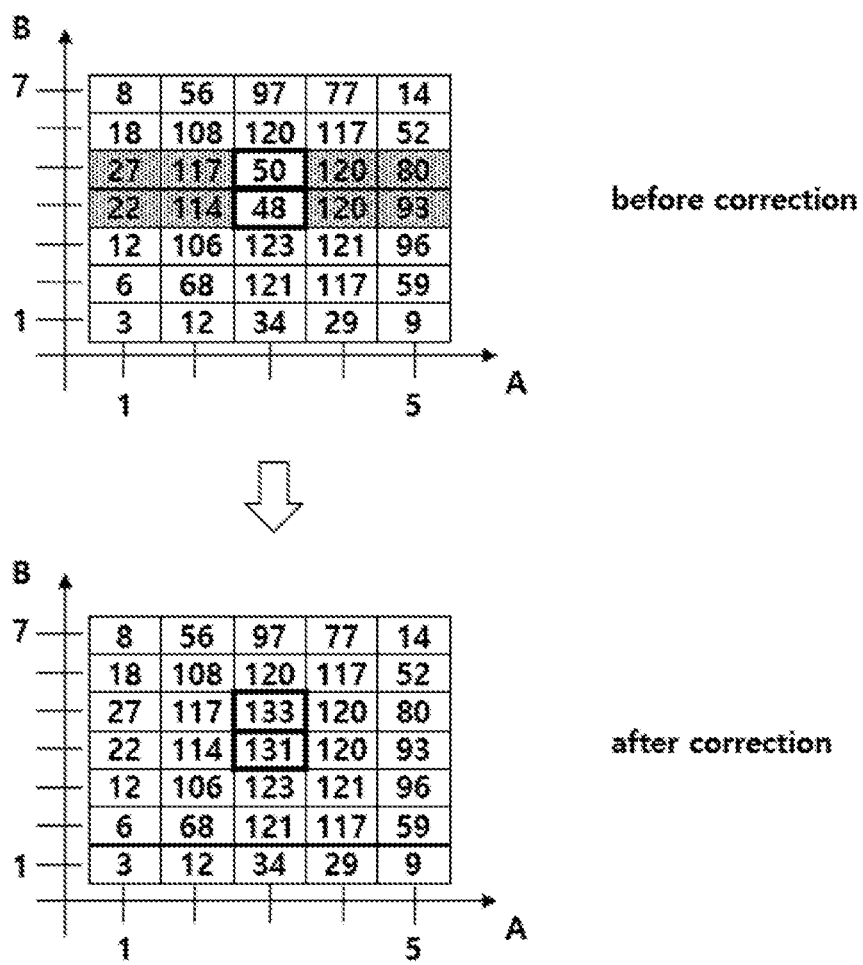
FIG. 23 illustrates an eighth example in which a touch sensing device corrects a defective touch electrode according to another exemplary embodiment.

FIG. 23 illustrates an eighth example in which a touch sensing device corrects a defective touch electrode according to another exemplary embodiment.

Referring to FIG. 23, when two defective touch electrodes, which are touch electrodes corresponding to coordinates (3, 4) and (3, 5), are adjacent to each other in a first direction, for example, a vertical direction, a touch sensing device, for example, a second processor, may replace the sensed values of the defective touch electrodes with a value obtained by putting the sensed values of four touch electrodes adjacent to each of the defective touch electrodes in a second direction, for example, a horizontal direction, perpendicular to the first direction into the bicubic equation.

Corrected value of first coordinates(3,4)=0*27+ 0.5625*117+0.5625*120+0*80=133

Corrected value of second coordinates(3,5)=0*22+ 0.5625*114+0.5625*120+0*93=131

Although the examples of correcting a defective touch electrode by applying four adjacent touch electrodes to the bicubic equation have been illustrated, the number of touch electrodes applied to the bicubic equation may be changed according to the exemplary embodiment. Here, the equation for the weight may also be changed according to the number of touch electrodes to be applied to the bicubic equation.

The present disclosure has been described with reference to some exemplary embodiments. According to these embodiments, it is possible to reuse a panel including a defective touch electrode while minimizing quality deterioration, thereby minimizing losses due to the disposal of the panel.

Since terms, such as "including," "comprising," and "having" mean that corresponding elements may exist unless they are specifically described to the contrary, it shall be construed that other elements can be additionally included, rather than that such elements are omitted. All technical, scientific or other terms are used consistently with the meanings as understood by a person skilled in the art unless defined to the contrary. Common terms as found in dictionaries should be interpreted in the context of the related technical writings, rather than overly ideally or impractically, unless the present disclosure expressly defines them so.

Although a preferred embodiment of the present disclosure has been described for illustrative purposes, those skilled in the art will appreciate that various modifications, additions and substitutions are possible, without departing from the scope and spirit of the embodiment as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A touch sensing device comprising:
a first processor configured to identify a defective sensed value that satisfies a defect determination condition among first sensed values of a plurality of electrodes disposed on a panel in a state where there is no touch or proximity of an external object to the panel;
a storage unit configured to store information indicating a defective electrode corresponding to the defective sensed value among the plurality of electrodes; and
a second processor configured to correct a sensed value corresponding to the defective electrode among second sensed values of the plurality of electrodes using a sensed value of at least one electrode adjacent to the defective electrode,
wherein the second sensed values of the plurality of electrodes are sensed values when there is a touch or proximity of the external object to the panel,
wherein when a plurality of defective electrodes is adjacent to each other in a first direction, the second processor corrects the sensed value of each defective electrode using sensed values of two adjacent electrodes in a second direction perpendicular to the first direction.

2. The touch sensing device of claim 1, wherein the first processor identifies the defective sensed value at a start time of an operation.

3. The touch sensing device of claim 1, wherein the first processor generates the first sensed values using raw sensed values received from a driving circuit at a start time of an operation, and identifies the defective sensed value when a difference between the raw sensed values and the first sensed values is a certain value or less during an in-operation time.

4. The touch sensing device of claim 3, wherein the first processor updates the first sensed values by averaging the raw sensed values obtained from a plurality of frames when the difference between the raw sensed values and the first sensed values is the certain value or less during the in-operation time.

5. The touch sensing device of claim 1, wherein the second processor corrects the sensed value corresponding to the defective electrode when at least one sensed value among the second sensed values satisfies a touch determination condition.

6. The touch sensing device of claim 1, wherein the first processor generates the first sensed values by averaging sensed values of the respective electrodes obtained from a plurality of frames.

7. The touch sensing device of claim 1, wherein the first processor selects representative sensed values from among the first sensed values and identifies a sensed value, which is different by a certain value or greater from an average value of the representative sensed values, among the first sensed values as the defective sensed value.

8. A touch sensing device comprising:
a first processor configured to identify a defective sensed value that satisfies a defect determination condition among first sensed values of a plurality of electrodes disposed on a panel in a state where there is no touch or proximity of an external object to the panel;
a storage unit configured to store information indicating a defective electrode corresponding to the defective sensed value among the plurality of electrodes; and
a second processor configured to correct a sensed value corresponding to the defective electrode among second sensed values of the plurality of electrodes using a sensed value of at least one electrode adjacent to the defective electrode,
wherein the second sensed values of the plurality of electrodes are sensed values when there is a touch or proximity of the external object to the panel, wherein when the defective electrode is disposed at edges of the plurality of electrodes, the second processor corrects the sensed value of the defective electrode using sensed values of two adjacent electrodes in parallel with the edges.

9. A touch sensing device comprising:
a first processor configured to identify a defective sensed value that satisfies a defect determination condition among first sensed values of a plurality of electrodes disposed on a panel in a state where there is no touch or proximity of an external object to the panel;
a storage unit configured to store information indicating a defective electrode corresponding to the defective sensed value among the plurality of electrodes; and
a second processor configured to correct a sensed value corresponding to the defective electrode among second sensed values of the plurality of electrodes using a sensed value of at least one electrode adjacent to the defective electrode,
wherein the second sensed values of the plurality of electrodes are sensed values when there is a touch or proximity of the external object to the panel,
wherein when the defective electrode is disposed in a corner of the plurality of electrodes, the second processor corrects the sensed value of the defective electrode using sensed values of two adjacent electrodes in first and second directions.

10. A touch sensing device comprising:
a memory configured to store information indicating a defective electrode among a plurality of electrodes disposed on a panel;
a correction processor configured to correct a sensed value corresponding to the defective electrode among sensed values of the plurality of electrodes using a sensed value of at least one electrode adjacent to the defective electrode; and
a coordinate calculator configured to calculate a touch coordinate using the corrected sensed value,
wherein the correction processor and the coordinate calculator are disposed in an integrated circuit,
wherein when the defective electrode is disposed at edges of the plurality of electrodes, the correction processor corrects the sensed value of the defective electrode using a value obtained by putting sensed values of four adjacent electrodes in parallel with the edges into a bicubic equation.

11. The touch sensing device of claim 10, wherein when there are four upper, lower, right, and left electrodes adjacent to the defective electrode, the correction processor replaces the sensed value of the defective electrode with a value obtained by putting sensed values of the four electrodes into a b-spline equation.

12. The touch sensing device of claim 10, wherein the memory comprises an interface configured to record the information in an internal cell according to a signal externally input.

13. The touch sensing device of claim 10, wherein a display panel and a touch panel are integrated to form the panel.

14. The touch sensing device of claim 10, further comprising:
a receiver configured to receive the sensed values of the plurality of electrodes from a plurality of driving integrated circuits that drives the plurality of electrodes separately by area.

15. The touch sensing device of claim 14, wherein the driving integrated circuits supply a driving signal, which alternates between a first voltage and a second voltage, to the electrodes and generate the sensed values of the electrodes according to a response signal formed on the electrodes corresponding to the driving signal, and
a voltage having a voltage level different from the first voltage and the second voltage is formed on the defective electrode.

16. The touch sensing device of claim 10, wherein the memory is disposed outside the integrated circuit.

* * * * *